United States Patent [19]
Lakshmi et al.

[11] Patent Number: 6,108,648
[45] Date of Patent: Aug. 22, 2000

[54] OPTIMIZER WITH NEURAL NETWORK ESTIMATOR

[75] Inventors: Seetha M. Lakshmi, Cupertino; Shaoyu Zhou, Mountain View, both of Calif.

[73] Assignee: Informix Software, Inc., Menlo Park, Calif.

[21] Appl. No.: 08/896,931

[22] Filed: Jul. 18, 1997

[51] Int. Cl.$^7$ .............................. G06F 17/30; G06F 15/18
[52] U.S. Cl. ................................... 707/2; 707/3; 706/17; 706/934
[58] Field of Search ................................ 706/15–17, 19, 706/25, 26, 27, 934; 707/1–5

[56] References Cited

U.S. PATENT DOCUMENTS

| | | | |
|---|---|---|---|
| 4,769,772 | 9/1988 | Dwyer ........................................ | 707/2 |
| 4,829,427 | 5/1989 | Green ........................................ | 707/4 |
| 5,237,678 | 8/1993 | Kuechler et al. ........................... | 707/5 |
| 5,335,345 | 8/1994 | Frieder et al. .............................. | 707/5 |
| 5,542,073 | 7/1996 | Schiefer et al. ............................ | 707/2 |
| 5,761,654 | 6/1998 | Tow ........................................... | 707/2 |
| 5,765,028 | 6/1998 | Gladden ..................................... | 706/25 |
| 5,778,353 | 7/1998 | Schiefer et al. ............................ | 707/2 |
| 5,806,059 | 9/1998 | Tsuchida et al. .......................... | 707/2 |
| 5,806,061 | 9/1999 | Chaudhuri et al. ........................ | 707/3 |

OTHER PUBLICATIONS

AberdeenGroup, Inc., "Universal Servers: RDBMS Technology for the Next Decade," *Technology Viewpoint*, vol. 9, No. 13, Jun. 3, 1996.

Informix Software, Inc., "Informix and Illustra Merge to Create Universal Server," Feb. 1996.

Informix Software, Inc., "Informix DataBlade Technology," 1996.

Informix Software, Inc., "Informix Times," Issue Two, 1996.

W. Perrizo and P. Ram, "A Neural Network Based Distributed Query Processing Strategy Selector," Mathematical Modeling and Scientific Computing, vol. 2, pp. 299–304, 1993.

P. Ram, "A Neural Network Based Distributed Query Processing Strategy Selector," A Thesis Submitted to the Graduate Faculty of the North Dakota State University of Agriculture and Applied Science, Fargo, ND, pp. 1–42 (appendices excluded), May 1991.

E. Bertino and P. Foscoli, "On Modeling Cost Functions for Oject–Oriented Databases," IEEE Transactions on Knowledge and Data Engineering, vol. 9, No. 3, pp. 500–508, Jun. 1997.

Min Wang et al., "Selectivity Estimation in the Presence of Alphanumeric Correlations," Proceedings of the 13th International Conference on Data Engineering, Apr. 1997, pp. 169–180.

S. Pakzad et al., "Design and Analysis of an Intelligent Support System for Large Databases," Proceedings of the 25th Hawaii International Conference on System Sciences, Jan. 1992, vol. 1, pp. 348–358.

*Primary Examiner*—Tariq R. Hafiz
*Assistant Examiner*—Jason W. Rhodes
*Attorney, Agent, or Firm*—Fish & Richardson P.C.

[57] ABSTRACT

A computer operated apparatus estimates values needed by an optimizer in a database management system (DBMS). The DBMS has one or more tables for storing data, each table having zero or more columns of user-definable data types and zero or more associated user-defined routines (UDRs). The apparatus has a feature vector extractor connected to the database tables for converting the UDR inputs into a base type representation. A neural network receives the feature vector and generates estimated values which are provided to the optimizer of the DBMS. The neural network can be trained periodically using randomly generated queries, or it can be trained dynamically by capturing data generated during a query. During operation, the optimizer dynamically invokes the neural network to generate estimates such as selectivity and cost per call for determining optimum query search sequence.

25 Claims, 7 Drawing Sheets

FIG._9 ic/ to the new data types. These
OPTIMIZER WITH NEURAL NETWORK ESTIMATOR

BACKGROUND OF THE INVENTION

The present invention relates to an optimization of queries being performed on a database management system (DBMS).

The advent of powerful, yet economical computers made possible by advances in processor, memory and data storage devices has made computers an integral part of modern companies. An important class of applications for these computers includes a DBMS where information is collected and organized according to a data model and searched via queries. The DBMS allows users to perform operations such as locating, adding, deleting and updating records stored in the computer without a detailed knowledge of how the information making up the records actually is stored in the computer.

One powerful type of DBMS is known as a relational DBMS where stored information appears to the user as a set of tables, each of which is termed a relation. In each relation, the information is arranged in rows and columns, with columns of data being related to each other by one or more predetermined functions.

To access particular information in the relational DBMS, a query compiler converts a user request typically expressed in a Structured Query Language (SQL) into a set of operations to be performed on one or more input relations to yield a solution responsive to the user's request.

As the volume of data stored in the DBMS grows, an efficient processing of user queries becomes important. The efficient processing of queries also is important when the DBMS is an object relational database that contains new data types other than traditional types such as text, integer, decimal, floating point and date types. For example, a product called Informix® Universal Server, available from Informix Corporation of Menlo Park, Calif., supports user-definable data types, such as graphics, video, animation, sound, 3D geometry and geospatial data types, among others. These new data types in turn require access methods and functions that operate on the new data types. These access methods and functions have introduced added difficulties for conventional query optimizers.

To minimize processing time and utilize resources more efficiently, a query optimizer typically is deployed to minimize disk input/output (I/O), memory, and processor loading, thus providing a lower expected processing cost for carrying out operations associated with the query. The query plan generated by the optimizer for accessing a particular row from a table which contains a user-defined data type may involve use of existing access methods such as sequential table scan and B-tree index scans or new access methods defined within the user-defined data type. If the query involves only a single table, the optimizer determines if the entire table is to be scanned or if any existing indices on the table are to be used. If the query involves multiple tables, the optimizer determines 1) the order in which the tables are accessed, 2) the method of access (table scanning or indexing), and 3) the order and method of joining tables.

In order for the optimizer to come up with good query plans accurate cost estimates are needed. Cost estimates typically are expressed as a combination of expected number of disk I/Os, number of rows that must be processed and the cost of evaluating the predicates for each row. If the estimates are inaccurate, the optimizer may produce inefficient query execution plans, resulting in poor search performance for these new data types.

An important metric in the optimization process, known as predicate selectivity, defined as the ratio of the number of rows in the result set to the total rows in the table. In evaluating alternate query execution strategies, the optimizer calls a selectivity estimation routine to access statistics stored in system tables relating to selectivity. Since selectivity is a function of the characteristics of the data, data type-specific statistics are periodically gathered and used for computing selectivity. For standard data types, statistics gathered typically include number of distinct values, minimum and maximum values, and the distribution of data values, expressed as a histogram. However, even for conventional data types, it is usually difficult to capture information for all relevant functions defined for the data type. For more complicated types, such as user-defined data types, the task of estimating selectivity could be cost prohibitive. If several operators and user-defined routines (UDRs) can operate on a given column of data, the optimizer needs selectivity estimates for each operator and UDR. The accuracy of selectivity estimates can have a significant impact on the query plan generated by the optimizer and in the performance of the query.

In addition to selectivity, the optimizer also considers the cost associated with different access methods, join strategies and predicate evaluation in coming up with a least expensive query execution strategy. Thus, if the new data type introduces new access methods, then associated cost formulae are needed by the optimizer. The cost per call value of functions associated with user-defined data types is usually fixed and can be measured during the initial testing period of each user-defined data type.

Because the selectivity and cost per call information for each user-defined data type depend on factors such as the distribution of values of the underlying column and values specified in the queries, deriving the selectivity function or the cost per call function during the design, implementation or testing of the user-defined data type is non-trivial. Hence, users may neglect to provide the functions for generating per call cost and selectivity estimates, which in turn causes the optimizer to use arbitrarily determined default estimates such as zero or one. The use of default estimates inaccurately captures dynamics in the DBMS, leading to inefficient query strategies.

SUMMARY

A computer operated apparatus generates values such as selectivity and cost per call information in a DBMS. The DBMS has one or more tables for storing data, each table having zero or more columns of user-definable data types (UDTs) and zero or more associated user-defined routines (UDRs). The apparatus includes a feature vector extractor connected to the database tables for converting input and output parameters of UDRs into base representations with standard data types. A neural network receives the feature vector output from the feature vector extractor and generates estimated optimization values for use by the optimizer in the DBMS.

The neutral network has two modes: a training mode where the neural network learns from data presented to it and a prediction mode where the previously trained neural network generates outputs based on new inputs. The neural network can be trained periodically using randomly generated queries, or it can be trained dynamically by capturing data generated during queries. During the prediction mode, an optimizer invokes the neural network dynamically to generate estimates used in determining optimum DBMS query search sequences for the DBMS. One neural network is needed for each UDR.

During training, the estimator generates a set of random queries using the chosen custom data type functions and table columns and gathers actual selectivity or cost per call information for these queries. The gathered data are divided into two groups: one for training and the other for validation. After the data has been gathered, the estimator trains the neural network with the gathered data by progressively adjusting weight and bias values in the network. The resulting weight and bias values of each neural network are stored in a table. The gathered validation data are then applied to the trained neural network to verify the accuracy of the neural network and to derive mean error margins. Based on the mean error margins, the user may decide to perform more training on the neural network. If a performance of the neural network is deemed acceptable, the user registers the neural network with the optimizer through a "SYSPROCEDURES" table.

In another aspect which provides dynamic training to the neural network, the user selects the particular database, table, column, selectivity function and associated parameters for training the neural network. During operation, selectivity statistics relating to the chosen selectivity function are gathered by tracing actual application queries issued by users and executed by the database server. UDR input parameters and actual selectivity values are collected, partitioned into training and validation data sets, and feature vectors are generated from the gathered statistics.

In another aspect, one or more neural network structures are trained on the feature vectors. An optimal neural network is selected as the winner. The structure of the winner neural network is translated into a selectivity function and registered in the system table suitable for use during the optimization process.

In yet another aspect involving the conversion of the neural network into a form suitable for on-the-fly invocation by the optimizer, the characteristics of the neural network are retrieved from a neural network storage table. The estimator generates a function whose parameters are equal to the number of input nodes in the neural network and expresses the weights of the neural network as a function. The function is compiled into a library.

Advantages of the invention include the following. The apparatus dynamically estimates selectivity and cost per call data without requiring knowledge of the distribution or histograms of column values. Further, the apparatus automatically collects necessary data from user-defined routines and queries associated with user-defined data types for training purposes.

Moreover, the histogram of value distribution in the table column is unnecessary and hence statistics collection routines are not required for each custom data type. The neural network estimator can be trained at predetermined intervals or dynamically by monitoring actual query executions, thus relieving the user of this burden. Furthermore, the architecture is extendible and flexible in that it may be applied to different functions needed by the optimizer in determining optimal search paths. Thus, to handle another UDR, another neural network can be created, trained and operated.

Other features and advantages will be apparent from the following description and the claims.

DESCRIPTION

Figure 1:
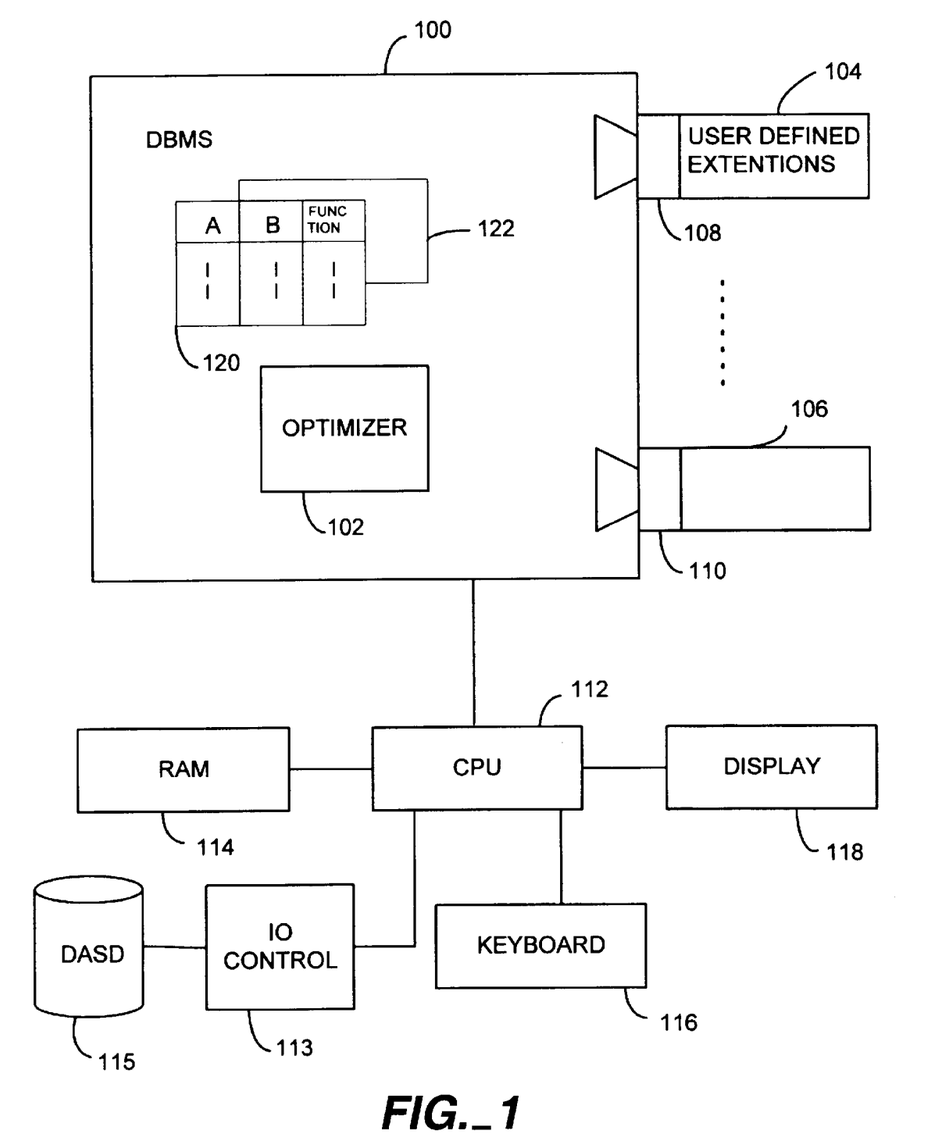
FIG. 1 is a block diagram of a computer system with a DBMS having user-defined data types and routines.

As shown in FIG. 1, a DBMS 100 includes an optimizer 102 and data tables 120, 122 having zero or more user-defined data types (UDTs) and UDRs is shown. One or more user defined extensions 104 and 106 named DataBlades™, available from Informix Corp., are adapted to be linked to the DBMS 100 for extending its capabilities for vertical applications. Each of components 104 and 106 relates to zero or more UDTs and zero or more associated UDRs. Estimators 108 and 110 bridge the DBMS 100 with the optimizer 102 and user-defined extensions 104 and 106, respectively.

The data tables 120 and 122 residing in the DBMS 100 are organized into columns, with each column having one attribute or relation. Further, each attribute or relation has a domain which includes data values in that column. A variety of operations may be performed on the tables in the database, including join, project and select operations. These operations may be performed on standard data types as well as user-defined data types.

In the DBMS 100, each UDR has an entry in a system procedure table which contains data such as procedure name, ownership, procedure identification number, mode, return size, data size, code size, number of arguments, specific name, external name, parameter style, language identification, parameter types, variant, client information, iterator, commutator, negator, class, stack requirement, selectivity function (selfunc) and per call cost, among others. The per call cost and selfunc information are used by the optimizer 102 to determine an optimum execution plan for queries.

The DBMS 100 typically is stored in a data storage device 115 accessible by a central processing unit (CPU) 112 via an input/output control unit 113. The CPU 112 accesses instructions and data stored in a random access memory (RAM) array 114. The CPU 112 is also connected to a keyboard 116 for receiving user input and to a display 118 for providing visual feedback to the user.

Figure 2:
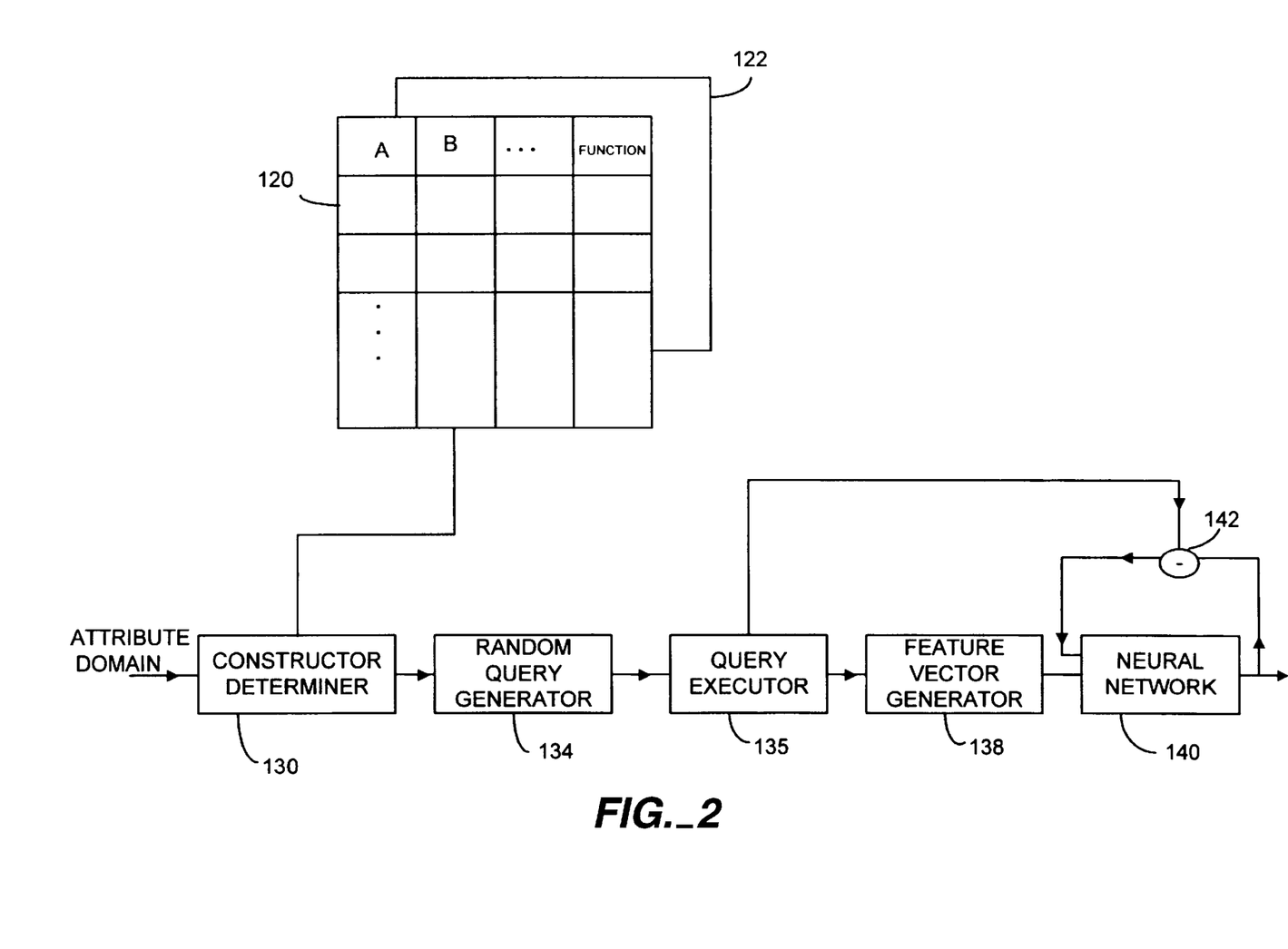
FIG. 2 is a block diagram illustrating an estimator in a training mode.

Turning now to FIG. 2, a block diagram of the estimator 108 or 110, as configured during its training mode, is shown. The representative tables 120 and 122 containing columns and UDRs in the DBMS 100 are accessed by a constructor determiner 130 and by a random query generator 134. The constructor determiner 130 analyzes the UDTs and the UDRs and breaks down the UDT inputs to UDRs into base data types such as integers, floats and characters. The random query generator 134 then generates various queries directed at tables 120–122 and buffers data generated by the queries.

The generated queries are executed by a query executor 135. The results generated by executor 135 is divided into a training data set and a validation data set. The training data set from the executor 135 is provided to a feature vector generator 138, which converts the data into appropriate numerical values to train a neural network 140. The resulting feature vectors are provided to the neural network 140 to generate predictions, while expected results are provided to an error estimator 142. The error estimator 142 compares the expected results against the neural network's outputs and generates a difference value, which is provided as a feedback to the neural network 140 to correct predictions from the neural network 140. This process is iteratively performed until the difference value falls below a predetermined threshold, or until the neural network 140 has been trained beyond a specified number of iterations.

After the neural network 140 has been trained with the training data set, the feature vector generator receives the validation data set from the query executor 135 and generates validation feature vectors which are provided to the neural network 140 to verify the accuracy of the neural network 140.

Figure 3:
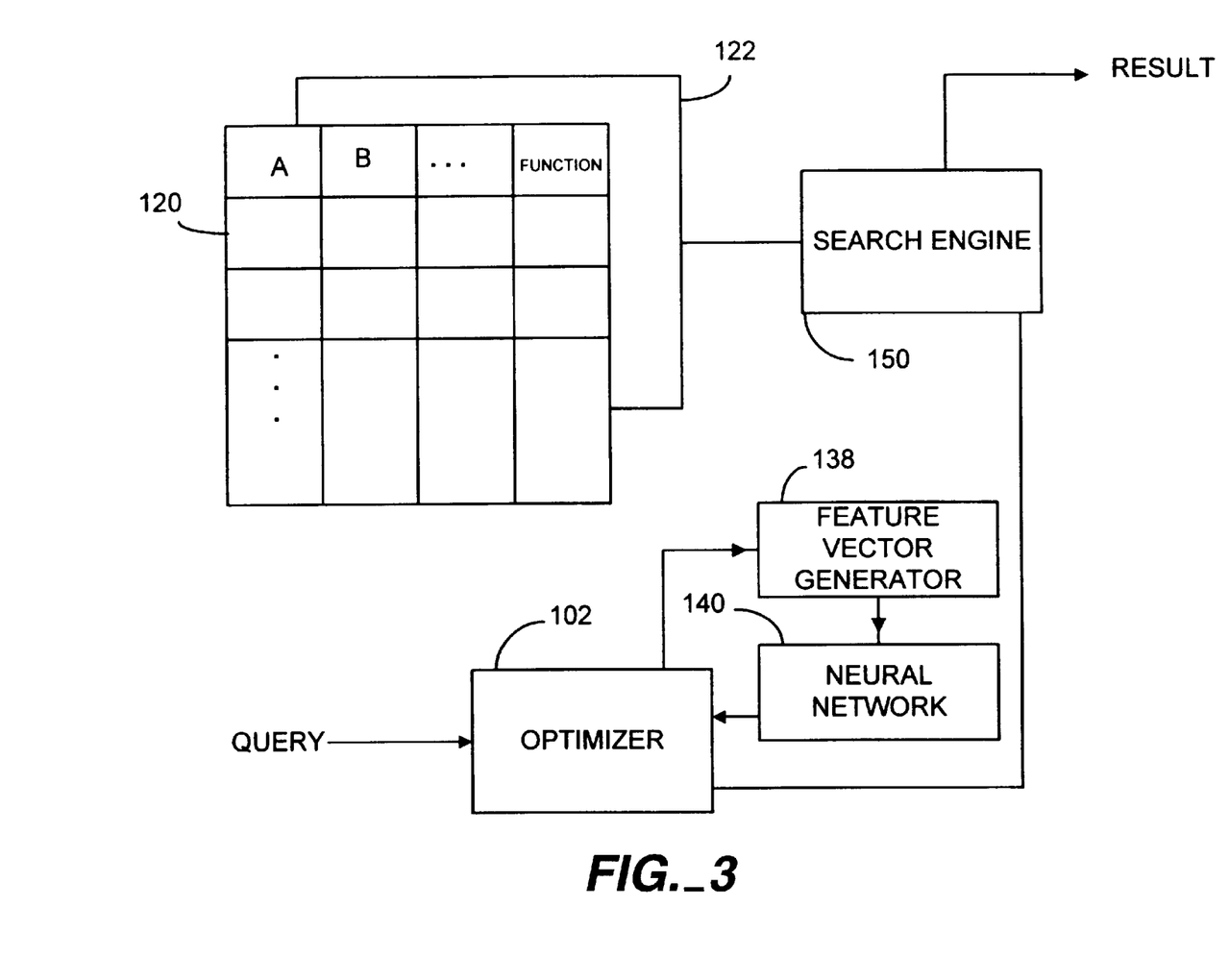
FIG. 3 is a block diagram illustrating the estimator of FIG. 2 in a prediction mode.

Turning now to FIG. 3, a block diagram of the estimator 108 or 110, as configured during its prediction mode, is shown. In FIG. 3, the query is provided to the optimizer 102. When the optimizer needs selectivity of a predicate involving a UDR, it passes the UDR to the feature vector generator 138 to convert the input UDTs, if any, into base types and to numerical representation suitable for the neural networks in the form of a feature vector. The feature vector is applied to the neural network 140 to generate the estimate. The output of the neural network 140 is provided to the optimizer 102, which in turn uses the estimates to determine an optimal search strategy. The optimal search strategy is provided to a search engine 150 in the DBMs. The search engine 150 performs the search on tables 120 and 122, and provides the result to the user.

Figure 4:
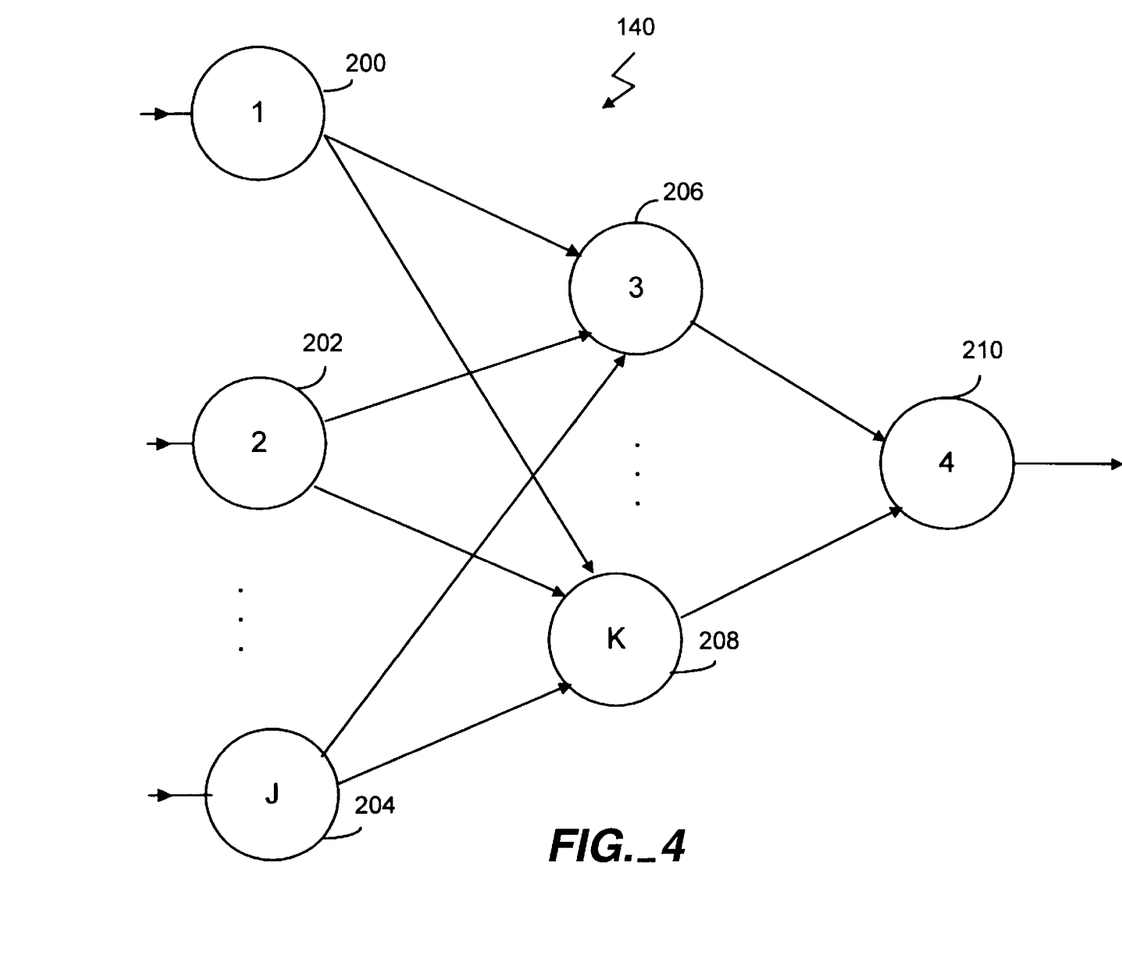
FIG. 4 is a diagram of a neural network of FIGS. 2 and 3.

Referring now to FIG. 4, the neural network 140 is shown in more detail. The neural network 140 is composed of equal basic processing units or neurons 200–210. Neurons 200–210 operate in parallel and process the data during a basic processing period called a processing cycle.

The neurons 200–210 are connected to the outside world and to each other by data channels. Each of neurons 200–210 has many input channels and a single output channel. Each channel carries one data unit for each processing cycle. Each of neurons 200–210 calculates a reaction to the data units in its input channels and forwards the reaction to the output channel in one processing cycle. The internal state of a particular neuron or channel is defined by values of its state variables, which are involved in the calculation of output values.

The neurons 200–210 in the neural network 140 are organized into layers. The neurons 200–204 which receive data directly from input channels of the network constitute an input layer. The neuron 210 feeding the output channel of the neural network 140 constitutes an output layer. The outputs of the input layer are fanned out into the input channels of neurons 206–208 which form the network's hidden layer. Although only one hidden layer is shown, more than one hidden layer can be deployed.

Each input neuron 200–204 in turn links to each of the hidden layer neurons 206–208 and each of the hidden layer neurons 206–208 is linked to the output neuron 210. Each of neurons 206–210 in the hidden and output layers is assigned a bias value to reflect its internal status. Further, each channel between two neurons in the network 140 is assigned a connection weight to represent its status. These bias and weight values are adjusted dynamically during the training period to generate the output of the network 140. A sigmoidal transfer function is used by each of neurons 200–210 in generating the output of the network 140. The code structure which represents the neural network remains unchanged once generated. Only variables representing weights and bias have their values changed during the training period. Further, different columns using the same custom data type-defined function may have different sets of weight and bias values.

During training operation, the neural network 140 receives inputs at neurons 200–204. The input values depend on the type of user-defined data types. For instance, if a circle type is a custom data type defined to capture items positioned within a radius range of a particular location, the circle type is characterized by three numerical values: X (x-coordinate of the center), Y (y-coordinate of the center) and R (radius). Thus, the network 140 representing the corresponding function has at its input nodes X, Y and R values. Further, since only one estimate is needed, in this case a selectivity estimate or a per call cost estimate, one neuron exists at the output layer of the neural network 140.

The neural network 140 operates in two modes. First, in a learning (or training) mode, the neurons 200–210 adjust their reactions so that certain combinations of data units at the input (data patterns) will induce certain reactions in the output of the network 140. Learning occurs by changing the network 140's memory represented as internal variables of neurons 200–210 and channels. Second, in the prediction mode where the network 140's memory is stable, the same reactions will appear at the output of the network 140 in response to the same data patterns at the input.

Several methods may be used to train the neural network 140. Generally, the network 140 learns by example, repeatedly processing a training file that contains a series of input vectors and the correct (or target) output vector for each. Back Propagation (BP) and cascade correction training for neural networks are particularly useful in modeling complex nonlinear functions. Cascade-Correlation (CC) differs from BP in the architecture where hidden units or neurons are added only one at a time and do not change after they have been added. A second difference is the learning algorithm, which creates and installs new hidden units. For each new hidden unit, the process tries to maximize the magnitude of the correlation between the new unit's output and the residual error signal of the neural network.

The sequence of steps during training for the BP network is as follows:

Receive an input pattern at the input layer.

Calculate the hidden layer weighted sums and apply the transfer function to the sums to produce hidden layer results.

Transmit the hidden-layer result to the output layer.

Calculate the output-layer weighted sums and apply the transfer function to the sums to produce the selectivity value.

Compare the generated selectivity value with the target value, calculating an output-layer error for the only output node.

Transmit the output-layer errors to the hidden layer (back propagation).

Calculate the hidden-layer error using the weighted sum of the back-propagated error vector moderated by the hidden-layer result.

Update the output-layer and hidden layer bias and connection weights using the Least Mean Squared Error (LMS) learning rule.

The sequence for the training of cascade correlation (CC) type neural networks is as follows:

CC network starts with a minimal network consisting only of an input and an output layer. Both layers are fully connected.

Train all the connections ending at an output unit with the usual learning algorithm until the error of the net no longer decreases.

Generate the so-called candidate units. Every candidate unit is connected with all input units and with all existing hidden units. Between the pool of candidate units and the output units, there are no weights.

Maximize the correlation between the activation of the candidate units and the residual error of the neural network by training all the links leading to a candidate unit. Learning takes place with an ordinary learning algorithm. The training is stopped when the correlation score no longer improves.

Choose the candidate unit with the maximum correlation, freeze its incoming weights and add it to the network. To change the candidate unit into a hidden unit, generate links between the selected unit and all the output units. Since the weights leading to the new hidden unit are frozen, a new permanent feature detector is obtained.

After training and validating the network 140, the weight and bias values are preserved in a table for subsequent loading at the request of the optimizer 102 to produce the estimated selectivity.

The training of the neural network 140 can be done in two ways. One is to perform the training periodically (FIG. 5) and the other is to perform the training dynamically (FIG. 6).

In the periodic training method (FIG. 5), training is performed when the user considers the training to be necessary. The initial training usually follows immediately after the creation of the database. Subsequent training may be started after the database has been updated heavily. In both occasions, a set of pre-designed queries are executed to get training data associated with the UDRs and UDTs.

Figure 5:
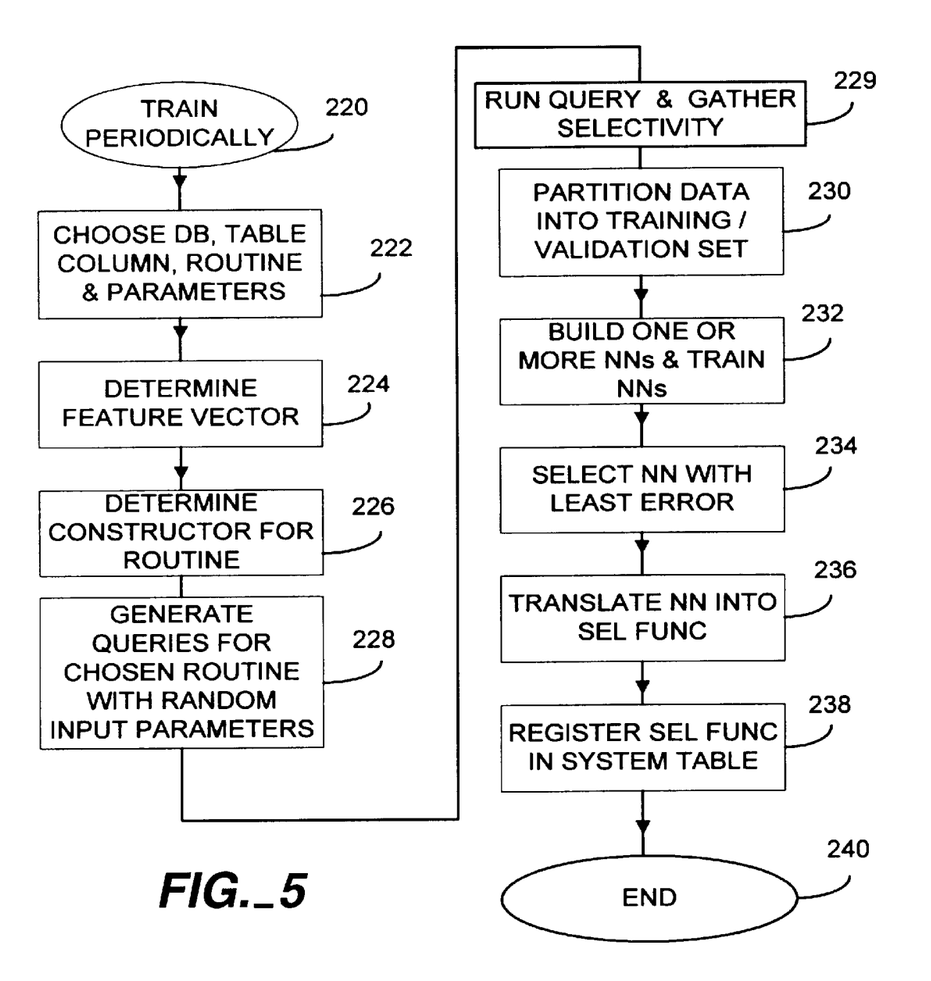
FIG. 5 is a flow chart illustrating a process for periodically training the estimator of FIG. 2.
Figures 6, 7:
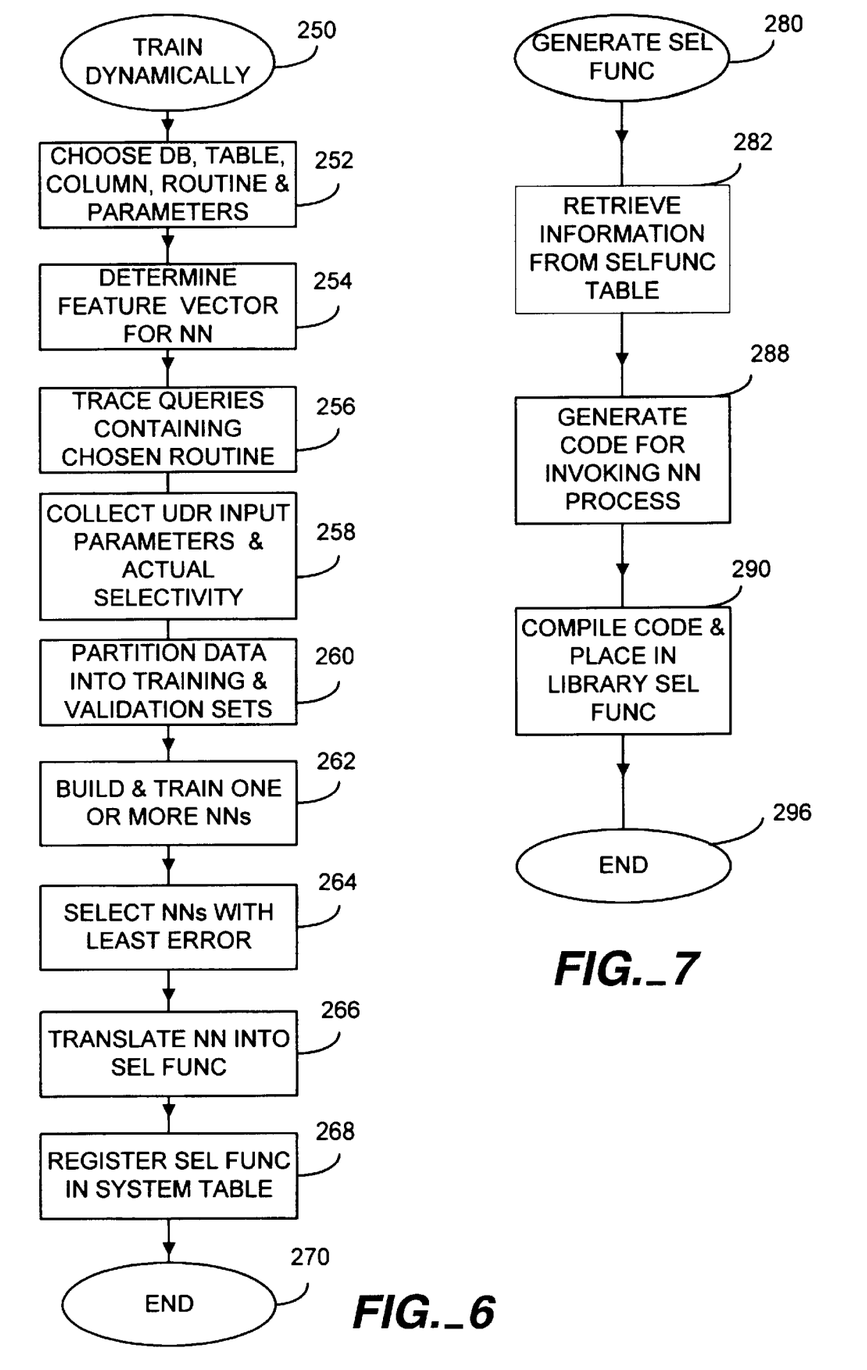
FIG. 6 is a flow chart illustrating a process for dynamically training the estimator of FIG. 2.
FIG. 7 is a flow chart illustrating a process for generating an estimate during the operation mode.

FIG. 5 illustrates a periodic training process 220 for the neural network 140. The process 220 prompts the user to choose the particular database, table, column, UDR and associated parameters (step 222). In this step, the user or application first connects to a specific database using a CONNECT command. The user can then view available tables within the chosen database and select one or more specific tables by querying a SYSTABLES table in the database. Moreover, the user can view columns in the selected table and select a specific column by querying a SYSCOLUMNS table in the database. Furthermore, the user or application can view a list of routines, including built-in routines and in the chosen column by querying a SYSPROCEDURES table in the database. After the column and the UDR have been selected, they are bound together so that the column can act as an operand for the UDR. This is done by identifying the parameters for the routine and passing the chosen column name through that parameter identification.

The operator or UDR may involve UDTs as input parameters. For example, a UDR function called contains (CIRCLE_OBJECT,C) involves a parameter of a user-defined type, circle. The input parameters for the routine are also used as input parameters for the neural network. As a requirement, the neural network needs to understand input parameter types so that a change in the input values will effect a change in the computed selectivity. UDTs such as circle, however, expose little operational details to the database server, making it difficult for the neural network to understand the domain of the UDT. Hence parameters of UDTs cannot be directly used as input to the neural network.

Rather, the estimator maps the UDTs to a set of atomic or base types that are understandable to the neural networks. For example, a circle object is characterized by the position of its center and its radius. Hence, a set of $\{X,Y,R\}$ is used to represent a circle object, where X and Y determine the position for the center and R determines the radius. This set of understandable base types that represent a UDT is referred to as a feature vector of the UDT. This feature vector can be provided by users who defined the UDTs. Alternatively, it can also be derived from the results of applying a set of functions (called feature functions) to the UDT.

Next, the process 220 determines a feature vector (step 224). In the above example with the circle type, the user/application may be presented with the following list:

point center (circle); /*the position of the center*/ int radius(circle); /*the value of the radius*/

The routine center returns an output of type "point" which is a UDT not understandable by the neural network. Consequently, the feature vector of type "point" has to be determined. In querying the system table as before, the user/application is given the following list of routines which take "point" as the sole input parameter:

int x(point); /*the X-axis position of the point*/ int y(point); /*the Y-axis position of the point*/

Both routines are needed as feature function for type "point". As a result, the feature vector of the circle type is finally determined as [x(center(circle)), y(center(circle)), radius(circle)] which is essentially a vector of 3 base type integers. These 3 integers are used as input parameters to the neural network.

The periodic training process 220 determines the appropriate constructors for the UDRs (step 226). Queries are generated for the chosen routines using random input parameters (step 228). These queries contain a number of numerical variables whose values are randomly generated. For instance, using circ and path types in the spatial custom data type previously discussed, the queries may be of the following form:

SELECT count(*) from paths

WHERE Contains(Circ(X,Y,R), path)

The queries are designed to determine the selectivity of the Contains function over the path column (which is path type) of the paths table, given the values of the circle surrounding the center point defined by (X, Y). The values of X (X-axis), Y (Y-axis) and R (radius) are generated by a random number generator, taking account of the domains of these three fields.

Usually, a fairly small set of training queries is sufficient as the actual results obtained by these queries can be repeatedly used in training the neural network 140. For example, a set of 50 queries may be generated for a Contains function and the database is queried 50 times to get 50 different values. These values along with the values of X, Y and R in the 50 queries can be repeatedly used in one training process 20 times to speed up the convergence of the network. The net effect is that a training set of 1000 queries is obtained while only 50 queries are executed by the server.

More specifically, one method to obtain the training and validation data set is to construct queries involving the chosen UDR, column and randomly generated values for parameters. These queries are then executed by the database and the actual number of rows returned by the database is collected. An example of a generated query is:

SELECT count(*) FROM a_table WHERE contains (a_circle_object,C)

Here, a_table and C represent the previously selected table and column, while the count(*) operation returns the number of rows in a_table which satisfy the predicate contains(a_circle_object, C).

In order to generate a query of the above format, a_circle_object is generated first. Since circle is a user-defined type, generating a random value for a_circle_object is not as easy as randomly generating a numerical value or a standard type such as an integer or a character string. Here, the constructor looks up the involved UDT, which are already registered with the database server. The user/application can view the list of registered routines which have the UDT name as their routine name in the database by querying the SYSPROCEDURES table, which for discussion, may have the following functions:

circle(int,int,int);

circle(point,int);

As only one constructor is needed for generating circle objects, the user/application chooses the simplest one (the one that takes only base type as input parameters), namely, circle(int,int,int). If circle(point,int) is chosen, a constructor for the point type is determined in order to generate the value of the first parameter to the chosen circle constructor. The expansion process is repeated until all the input fields to the chosen constructor are of base types.

After circle(int,int,int) has been chosen as the constructor to use, a number of random number sets each consisting of 3 random numbers r1, r2 and r3 are generated as follows: SELECT count(*)FROM a_table WHERE contains(circle (r1,r2,r3),C)

These queries are executed in step 229 and the gathered data are partitioned into two categories: training queries and validation queries before they are issued to the database. The results of these queries are collected and stored into a training set and a validation set, respectively (step 230). The details of the random queries such as the value of random number used are also written to the training/validation set with the corresponding query results.

Next, the process 220 then builds one or more neural network (NN) structures, which differ in the number of layers, the number of neurons in each layer and their connection architecture, before applying the feature vector to the neural networks (step 232). The results of step 232 are analyzed and the neural network structure with the best result (least error) is selected as a winner (step 234). The structure of the winner neural network is translated into a function such as the selectivity function (SelFunc) or the cost per call function in step 236. The generated function is registered in a system table (step 238) suitable for use during the optimization process before the process 220 exits (step 240).

Typically a user-defined data type includes a number of server operators/functions. Many of these functions can be used in SQL WHERE clauses and hence may require a selectivity function. For example, a geodetic custom data type includes operators such as Beyond, Inside, Intersect, Outside and Within, as well as other functions AltRange, Azimuth, Begin, Bottom, Coords, End, etc. These functions can all be used in the WHERE clause of a SQL statement. For non-operator functions where the UDR appears on one side of the built-in operator, the values of parameters or constants on the other side of the built-in operator could be used as one of the input parameters to the selectivity function. For an operator function, the input parameters to the operator, which is of a custom data type-defined type, could be the input to the selectivity function. Because each column of a table with a custom data type-defined type requires selectivity functions for all relevant operators/functions, the training of neural networks representing all these selectivity functions using randomly-generated SQL queries may become costly.

To minimize training time, the user specifies particular columns which need selectivity functions for particular UDRs. The user can identify the columns by analyzing the execution of queries in applications on the database. After training has been completed, the users can instruct the optimizer 102 to use a particular estimator in lieu of a default value to improve the optimization process.

As an alternative to the periodic training method, the neural network 140 can be trained dynamically to avoid the need for generating random queries to obtain the information for training the chosen estimate functions. Similar to the process 220, a dynamic training process 250 (FIG. 6) prompts the user to choose the particular database, table, column, selectivity routine and associated parameters (step 252). Next, the process 250 determines a feature vector (step 254). During training, a set of selectivity functions is selected and a command is issued to gather actual selectivity statistics through tracing the queries executed by the server (step 256). These queries are actual application queries issued by users or applications. The UDR input parameters and actual selectivity values are collected (step 258) and partitioned into training and validation data sets (step 260).

The process 250 then builds one or more neural network structures, which differ by the number of layers, the number of neurons in each layer and their connectivity, before applying the feature vector to the neural networks (step 262). The results of step 262 are analyzed and the neural network structure with the best result (least error) is selected (step 264). The structure of the selected neural network is translated into a selectivity function (SelFunc) in step 266. The generated SelFunc is registered in a system table (step 268) suitable for use during the optimization process before the process 250 exits (step 270).

The chosen selectivity functions improve their mean prediction accuracy over the training period. When the mean accuracy of the selectivity functions reaches a satisfactory level, the user may instruct the optimizer 102 to use the neural network in estimating selectivity or cost per call information when optimizing execution plans for queries. After the database has been substantially altered due to new data, the user may initiate another training period to obtain new values of bias and weight used in the estimating process.

In this approach, the estimator monitors the selectivity of each node in a query execution tree. When a node in the query tree involves custom data type-defined operators/functions, a monitor module gathers data such as the function name, column name, input constants and the number of qualified rows. After data for a node involving UDRs have been gathered, the module runs the corresponding selectivity function to obtain the predicted selectivity value and then activates a training process, such as the Back Propagation algorithm, to adjust the bias and weight values. The new values are stored in the sysdistrib/sysselectivity table.

Turning now to FIG. 7, a process 280 for generating computer instructions for a selectivity function is shown. The process 280 initially retrieves information from the SelFunc table (step 282). Using this information, code is generated to invoke the neural network chosen in step 264 (step 288) and the resulting code is compiled and placed in an appropriate library such as a SelFunc library (step 290) before exiting (step 296).

Figure 8:
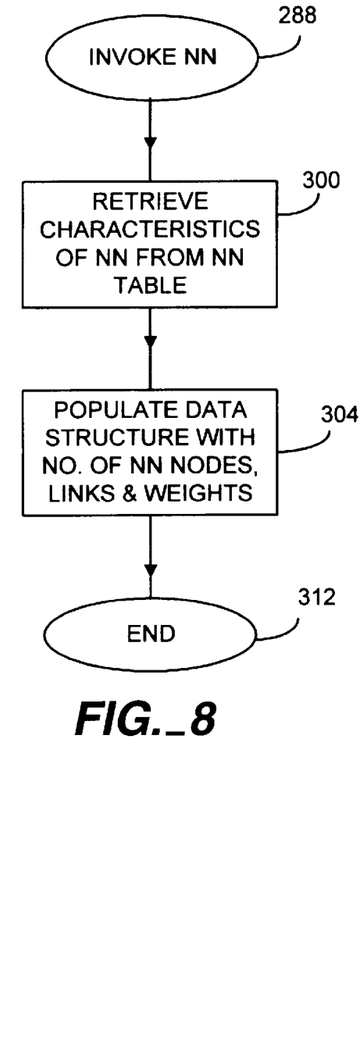
FIG. 8 is a flow chart illustrating a process for constructing the neural network of FIG. 4.

Referring now to FIG. 8, the invocation of the neural network in step 288 of FIG. 7 is shown. The invocation process 288 first retrieves characteristics of the neural network from a neural network storage table (step 300). Next, the process 288 generates a data structure and populates the data structure with the number of nodes, links and weights (step 304) before exiting (step 312).

Figure 9:
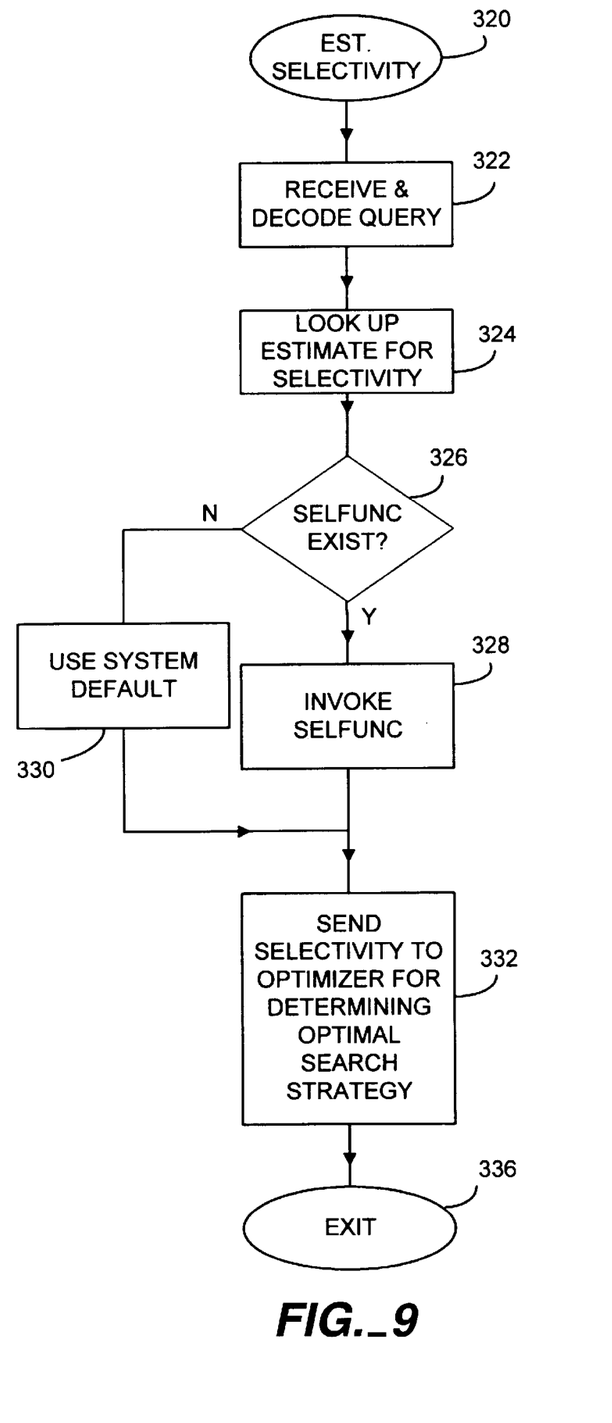
FIG. 9 is a flow chart illustrating a process of invoking the selectivity estimator by the optimizer.

Turning now to FIG. 9, a process 320 for estimating selectivity using the generated neural network is shown. The process 320 receives and decodes the query which references a UDR (step 322). Next, the process 320 looks up estimate tables for functions noted in the query (step 324). The process 320 checks if SelFunc already exist (step 326). If not, the process 320 uses system default values (step 330). Alternatively, the SelFunc is invoked to generate selectivity values (step 328). From step 326 or 328, the generated selectivity values are sent to the optimizer for determining the optimal search plan (step 332). The optimum search plan is then sent to the search engine before the process 320 exits (step 336).

Hence, upon encountering a predicate involving the concerned UDR and column during the optimization process, the optimizer looks for the SelFunc in the system tables using the UDR and column names along with the number of the parameter field in which the column is passed to the UDR. If the SelFunc is not found, which means a selectivity function is not yet generated for the concerned UDR, column and parameter field, the optimizer will use a built-in default sensitivity value. Otherwise, the optimizer will find the compiled code for the retrieved SelFunc and execute it using the appropriate input values. The results of the execution are then used as the selectivity value for the concerned predicate.

Further, the estimates for UDRs consist of formulas which represent the chosen neural network structure. These formulas use bias and weight values which are determined during the training period. After the training period, bias and weight values are stored in a database table for retrieval and use by the SelFunc module dynamically.

The operation of the neural network based selectivity estimated is further illustrated in the following examples:

EXAMPLE 1

This example tests the BP algorithm against selectivity function for a Contains(Circ,Path) operator. The paths table (which includes a column pth of path type) is generated using a random number generator and its size is 1000 rows. The target selectivity value is obtained using the following query:

select X, Y, R, count(*) from paths
where Contains(Circ(X,Y,R),pth);

The queries are also generated using a random number generator (for (X,Y,R)). The query file initially contains 100 queries. These 100 queries are repeated 10 times and hence the training set contains 1000 queries. This experiment uses the initial 100 queries also as the validation query set. The results are shown in Table 1.

EXAMPLE 2

This example also tests the BP algorithm against selectivity function for the Contains(Circ,Path) operator. The paths table was generated using a random number generator and its size is 1000 rows. The Query used is the same as in Example 1. Similar to Example 1, the queries were also generated using a random number generator (for (X,Y,Z)). The query file initially contains 100 queries. These 100 queries are repeated 10 times and hence the training set contains 1000 queries. The difference is that, in this experiment, another 100 queries were generated using the random number generator and used in the validation exercise after the training is completed. The validation results are shown in Table 2.

EXAMPLE 3

In the previous two examples, the number of nodes in the hidden layer of the BP network was set to 6. In this example, the number of nodes is reduced to 3. Other settings are the same as in example 2. This configuration actually produces a smaller error margin, as show in Table 3.

From the above three examples, it can be seen that the average error margin of the BP algorithm for predicting selectivity of the Contains function is well within the acceptable range. The cost for executing the neural network is also very small as a small size network is already sufficient for our application. The main portion of the training time is used for querying the database using the 100 randomly-generated training queries and 100 validation queries.

Although the above processes have been described with respect to the estimation of selectivity, the same processes can be applied to the estimation of cost. Unlike selectivity, cost per call for a custom data type-defined function is usually a constant value. Hence the type of a per call cost column in the sysprocedures table is an integer. The cost value of a custom data type function relative to other operations such as I/O may be measured during the initial testing period of the UDT. When a new UDT is registered with the database, a set of data and queries are also registered and used to test the UDT. Some of these queries may be used to measure the cost of a Custom data type function which is declared as expensive. Typically such a query applies the associated UDR to a set of carefully chosen values of relevant types representing the input parameters to the function. As part of the installation process, these queries will be executed and initial estimates of the costs will be provided based on the measuring results of these queries. These estimates can be based either purely on the statistics collected or combined with some interactive input from users. The absolute cost per call of the function is determined by subtracting the extra overhead for other operations in the query. This absolute cost value is then compared with the cost of a standard operation such as an I/O operation to obtain the relative value of cost per call of the Custom data type-defined function. The derived relative value of cost per call is stored in the sysprocedures table. Another neural network is then trained on the cost function to return the prediction of cost per call given a set of input parameters. Hence, the neural network can be adapted to generate additional estimates for guiding the optimizer in making its decision.

Moreover, the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Although back propagation type neural network and cascade-correlation type neural networks have been disclosed, other suitable neural network architectures may be used. Further, while the invention has been shown and described with reference to an embodiment thereof, those skilled in the art will understand that the above and other changes in form and detail may be made without departing from the spirit and scope of the following claims.

TABLE 1

| | R | Y | X | Target | Prediction | Error |
|---|---|---|---|---|---|---|
| 0: | 34 | 135 | 282 | 0 | 0 | 0 |
| 1: | 2 | 130 | 281 | 0 | 0 | 0 |
| 2: | 205 | 150 | 264 | 66 | 74.244926 | 0.008244926 |
| 3: | 149 | 238 | 216 | 10 | 0 | 0 |
| 4: | 294 | 145 | 135 | 220 | 221.659348 | 0.001659348 |
| 5: | 173 | 241 | 194 | 36 | 17.534754 | 0.018465246 |
| 6: | 407 | 268 | 248 | 1000 | 960.005188 | 0.039994812 |
| 7: | 276 | 196 | 160 | 310 | 232.673828 | 0.077326172 |
| 8: | 35 | 120 | 236 | 0 | 0 | 0 |
| 9: | 115 | 160 | 118 | 1 | 0 | 0.001 |
| 10: | 46 | 178 | 125 | 0 | 0 | 0 |
| 11: | 363 | 164 | 242 | 913 | 756.605652 | 0.156394348 |
| 12: | 203 | 267 | 209 | 94 | 101.391815 | 0.007391815 |
| 13: | 52 | 197 | 239 | 0 | 0 | 0 |
| 14: | 265 | 183 | 283 | 370 | 337.956909 | 0.032043091 |
| 15: | 417 | 178 | 194 | 986 | 909.052917 | 0.076947083 |
| 16: | 348 | 251 | 208 | 968 | 720.947388 | 0.247052612 |
| 17: | 169 | 290 | 191 | 29 | 32.215137 | 0.003215137 |
| 18: | 210 | 299 | 270 | 108 | 200.175049 | 0.092175049 |
| 19: | 60 | 204 | 239 | 0 | 0 | 0 |
| 20: | 174 | 207 | 160 | 34 | 0 | 0.034 |
| 21: | 490 | 191 | 294 | 1000 | 1000 | 0 |
| 22: | 95 | 190 | 275 | 0 | 0 | 0 |
| 23: | 54 | 287 | 276 | 0 | 0 | 0 |
| 24: | 176 | 177 | 142 | 29 | 0 | 0.029 |
| 25: | 65 | 100 | 230 | 0 | 0 | 0 |
| 26. | 181 | 292 | 151 | 29 | 29.157698 | 0.000157698 |
| 27: | 111 | 199 | 215 | 0 | 0 | 0 |
| 28: | 348 | 246 | 106 | 537 | 563.822144 | 0.026822144 |
| 29: | 402 | 260 | 287 | 1000 | 968.217712 | 0.031782288 |
| 30: | 31 | 132 | 150 | 0 | 0 | 0 |
| 31: | 60 | 218 | 237 | 0 | 0 | 0 |
| 32: | 270 | 294 | 299 | 418 | 495.994324 | 0.077994324 |
| 33: | 60 | 274 | 184 | 0 | 0 | 0 |
| 34: | 394 | 174 | 181 | 935 | 819.338074 | 0.115661926 |
| 35: | 347 | 247 | 136 | 696 | 608.443909 | 0.087556091 |
| 36: | 188 | 288 | 103 | 21 | 10.055005 | 0 |
| 37: | 454 | 226 | 128 | 998 | 969.606995 | 0.028393005 |
| 38: | 414 | 115 | 245 | 939 | 906.5047 | 0.0324953 |
| 39: | 349 | 300 | 257 | 969 | 816.794861 | 0.152205139 |
| 40: | 303 | 120 | 198 | 332 | 329.134705 | 0.002865295 |
| 41: | 345 | 174 | 165 | 727 | 565.024048 | 0.161975952 |
| 42: | 11 | 181 | 243 | 0 | 0 | 0 |
| 43: | 226 | 176 | 265 | 164 | 152.362996 | 0.011617004 |
| 44: | 436 | 168 | 207 | 1000 | 958.710205 | 0.041289795 |
| 45: | 39 | 210 | 231 | 0 | 0 | 0 |
| 46: | 273 | 218 | 200 | 479 | 296.528229 | 0.182471771 |
| 47: | 412 | 139 | 296 | 1000 | 949.106704 | 0.050891296 |
| 48: | 108 | 241 | 215 | 1 | 0 | 0.001 |
| 49: | 290 | 271 | 168 | 527 | 385.598511 | 0.141401489 |
| 50: | 69 | 22 | 259 | 0 | 0 | 0 |

TABLE 1-continued

| | R | Y | X | Target | Prediction | Error |
|---|---|---|---|---|---|---|
| 51: | 432 | 220 | 109 | 953 | 902.260071 | 0.050739929 |
| 52: | 145 | 205 | 159 | 8 | 0 | 0.008 |
| 53: | 30 | 165 | 161 | 0 | 0 | 0 |
| 54: | 19 | 169 | 170 | 0 | 0 | 0 |
| 55: | 245 | 154 | 261 | 229 | 195.345459 | 0.033654541 |
| 56: | 73 | 169 | 163 | 0 | 0 | 0 |
| 57: | 348 | 179 | 289 | 947 | 760.92218 | 0.18607782 |
| 58: | 65 | 138 | 173 | 0 | 0 | 0 |
| 59: | 52 | 170 | 223 | 0 | 0 | 0 |
| 60: | 341 | 154 | 121 | 433 | 443.231049 | 0.010231049 |
| 61: | 492 | 197 | 126 | 1000 | 1000 | 0 |
| 62: | 270 | 287 | 202 | 468 | 353.743011 | 0.114256989 |
| 63: | 313 | 285 | 103 | 378 | 414.679443 | 0.036679443 |
| 64: | 404 | 111 | 19 | 729 | 752.576255 | 0.023576355 |
| 65: | 320 | 125 | 258 | 480 | 521.499512 | 0.041499512 |
| 66: | 338 | 179 | 152 | 628 | 511.006531 | 0.116993469 |
| 67: | 396 | 277 | 164 | 997 | 675.861938 | 0.121136062 |
| 68: | 74 | 222 | 192 | 0 | 0 | 0 |
| 69: | 38 | 163 | 280 | 0 | 0 | 0 |
| 70: | 246 | 209 | 265 | 324 | 255.205338 | 0.068794662 |
| 71: | 2 | 178 | 245 | 0 | 0 | 0 |
| 72: | 56 | 289 | 157 | 0 | 0 | 0 |
| 73: | 289 | 233 | 145 | 394 | 306.717834 | 0.087282166 |
| 74: | 191 | 122 | 237 | 29 | 12.813066 | 0 016186934 |
| 75: | 206 | 273 | 202 | 97 | 107.036308 | 0.010036308 |
| 76: | 129 | 248 | 193 | 2 | 0 | 0.002 |
| 77: | 106 | 139 | 168 | 1 | 0 | 0.001 |
| 78: | 335 | 296 | 281 | 898 | 784.700806 | 0.113299194 |
| 79: | 308 | 141 | 294 | 510 | 530.596252 | 0.020596252 |
| 80: | 317 | 147 | 245 | 560 | 810.61087 | 0.04938913 |
| 81: | 498 | 242 | 131 | 1000 | 1034.921143 | 0.034921143 |
| 82: | 179 | 220 | 173 | 42 | 5.551519 | 0.036448481 |
| 83: | 498 | 130 | 289 | 1000 | 1055.22522 | 0.05522522 |
| 84: | 183 | 206 | 239 | 43 | 43.675995 | 0.000675995 |
| 85: | 398 | 267 | 174 | 1000 | 885.417969 | 0.114582031 |
| 86: | 204 | 193 | 222 | 100 | 67.488365 | 0.032511635 |
| 87: | 307 | 182 | 145 | 392 | 338.076202 | 0.053923798 |
| 88: | 148 | 141 | 124 | 6 | 0 | 0.006 |
| 89: | 331 | 245 | 247 | 977 | 687.24762 | 0.28975238 |
| 90: | 60 | 135 | 127 | 0 | 0 | 0 |
| 91: | 404 | 101 | 208 | 814 | 829.720581 | 0.016720581 |
| 92: | 148 | 194 | 163 | 9 | 0 | 0.009 |
| 93: | 101 | 200 | 249 | 0 | 0 | 0 |
| 94: | 291 | 295 | 178 | 553 | 430.068817 | 0.122931183 |
| 95: | 277 | 216 | 149 | 326 | 241.738617 | 0.084261383 |
| 96: | 107 | 186 | 166 | 1 | 0 | 0.001 |
| 97: | 100 | 244 | 220 | 1 | 0 | 0.001 |
| 98: | 118 | 162 | 164 | 2 | 0 | 0.002 |
| 99: | 429 | 147 | 227 | 995 | 947.236572 | 0.047763428 |

Average Error margin: 0.040115842

TABLE 2

| | R | Y | X | Target | Prediction | Error |
|---|---|---|---|---|---|---|
| 0: | 125 | 111 | 294 | 0 | 0 | 0 |
| 1: | 363 | 255 | 258 | 1000 | 840.915161 | 0.159084839 |
| 2: | 73 | 132 | 280 | 0 | 0 | 0 |
| 3: | 306 | 101 | 120 | 155 | 203.80603 | 0.04880603 |
| 4: | 112 | 215 | 127 | 1 | 0 | 0.001 |
| 5: | 145 | 246 | 199 | 12 | 0 | 0.012 |
| 6: | 396 | 206 | 292 | 1000 | 938.63739 | 0.06136261 |
| 7: | 9 | 155 | 257 | 0 | 0 | 0 |
| 8: | 198 | 232 | 228 | 8i | 82.406433 | 0.001406433 |
| 9: | 372 | 269 | 199 | 997 | 823.440613 | 0.173559387 |
| 10: | 171 | 276 | 149 | 21 | 5.920382 | 0.015079618 |
| 11: | 110 | 279 | 151 | 0 | 0 | 0 |
| 12: | 426 | 232 | 149 | 995 | 924.807678 | 0.070192322 |
| 13: | 372 | 291 | 265 | 990 | 894.893005 | 0.095106995 |
| 14: | 474 | 111 | 207 | 997 | 1000 | 0.003 |
| 15: | 296 | 120 | 112 | 142 | 172.541183 | 0.030541183 |
| 16: | 139 | 268 | 185 | 7 | 0 | 0.007 |
| 17: | 54 | 214 | 176 | 0 | 0 | 0 |
| 18: | 86 | 277 | 198 | 0 | 0 | 0 |

TABLE 2-continued

|     | R   | Y   | X   | Target | Prediction | Error       |
|-----|-----|-----|-----|--------|------------|-------------|
| 19: | 176 | 218 | 218 | 37     | 24.893641  | 0.012106359 |
| 20: | 441 | 189 | 221 | 1000   | 983.341187 | 0.016658813 |
| 21: | 175 | 177 | 202 | 34     | 0          | 0.034       |
| 22: | 126 | 151 | 241 | 0      | 0          | 0           |
| 23: | 301 | 194 | 142 | 379    | 317.352509 | 0.061647491 |
| 24: | 340 | 166 | 245 | 828    | 653.554626 | 0.174445374 |
| 25: | 212 | 289 | 223 | 119    | 153.432343 | 0.034432343 |
| 26: | 55  | 259 | 171 | 0      | 0          | 0           |
| 27: | 346 | 226 | 299 | 976    | 799.638062 | 0.176361938 |
| 28: | 71  | 181 | 118 | 0      | 0          | 0           |
| 29: | 493 | 146 | 178 | 1000   | 1000       | 0           |
| 30: | 68  | 223 | 169 | 0      | 0          | 0           |
| 31: | 468 | 100 | 248 | 1000   | 1000       | 0           |
| 32: | 444 | 173 | 120 | 945    | 918.448486 | 0.026551514 |
| 33: | 103 | 121 | 279 | 0      | 0          | 0           |
| 34: | 162 | 148 | 173 | 16     | 0          | 0.016       |
| 35: | 106 | 185 | 201 | 0      | 0          | 0           |
| 36: | 273 | 195 | 103 | 161    | 148.198883 | 0.0128011#7 |
| 37: | 493 | 192 | 210 | 1000   | 1000       | 0           |
| 38: | 253 | 246 | 275 | 428    | 333.996216 | 0.094003784 |
| 39: | 493 | 230 | 228 | 1000   | 1000       | 0           |
| 40: | 224 | 178 | 172 | 119    | 64.668304  | 0.054331696 |
| 41: | 486 | 238 | 144 | 1000   | 1000       | 0           |
| 42: | 103 | 232 | 258 | 1      | 0          | 0.001       |
| 43: | 205 | 103 | 298 | 39     | 69.150261  | 0.030150261 |
| 44: | 172 | 119 | 276 | 13     | 3.061308   | 0.009938692 |
| 45: | 300 | 248 | 294 | 799    | 599.78772  | 0.19921228  |
| 46: | 463 | 247 | 208 | 1000   | 1000       | 0           |
| 47: | 288 | 201 | 208 | 580    | 361.855743 | 0.218144257 |
| 48: | 5G0 | 234 | 282 | 1000   | 1000       | 0           |
| 49: | 382 | 136 | 141 | 715    | 677.362183 | 0.037637817 |
| 50: | 21  | 203 | 285 | 0      | 0          | 0           |
| 51: | 270 | 263 | 197 | 497    | 323.440388 | 0.173559692 |
| 52: | 481 | 141 | 111 | 959    | 977.36145  | 0.01836145  |
| 53: | 272 | 172 | 257 | 424    | 323.608459 | 0.180391541 |
| 54: | 174 | 185 | 200 | 36     | 0          | D.036       |
| 55: | 156 | 237 | 160 | 12     | 0          | 0.012       |
| 56: | 25  | 197 | 295 | 0      | 0          | 0           |
| 57: | 430 | 206 | 125 | 961    | 902.875488 | 0.058124512 |
| 58: | 87  | 146 | 144 | 0      | 0          | 0           |
| 59: | 441 | 236 | 175 | 1000   | 975.152344 | 0.024847656 |
| 60: | 365 | 229 | 282 | 1000   | 854.424072 | 0.145575928 |
| 61: | 64  | 192 | 273 | 0      | 0          | 0           |
| 62: | 272 | 116 | 165 | 147    | 146.94545  | 5.455E-05   |
| 63: | 88  | 171 | 200 | 0      | 0          | 0           |
| 64: | 338 | 254 | 166 | 821    | 615.436707 | 0.205563293 |
| 65: | 372 | 286 | 203 | 1000   | 838.1698   | 0.1618302   |
| 66: | 256 | 251 | 293 | 412    | 376.973816 | 0.035026184 |
| 67: | 310 | 295 | 288 | 792    | 682.265381 | 0.109734619 |
| 68: | 65  | 143 | 262 | 0      | 0          | 0           |
| 69: | 409 | 147 | 193 | 942    | 865.506042 | 0.076493958 |
| 70: | 445 | 249 | 161 | 1000   | 979.123596 | 0.020876404 |
| 71: | 156 | 294 | 150 | 10     | 0          | 0.01        |
| 72: | 71  | 243 | 251 | 0      | 0          | 0           |
| 73: | 452 | 200 | 179 | 1000   | 984.737793 | 0.015262207 |
| 74: | 84  | 267 | 204 | 0      | 0          | 0           |
| 75: | 85  | 276 | 222 | 0      | 0          | 0           |
| 76: | 12  | 193 | 147 | 0      | 0          | 0           |
| 77: | 133 | 172 | 144 | 3      | 0          | 0.003       |
| 78: | 17  | 147 | 146 | 0      | 0          | 0           |
| 79: | 24  | 202 | 277 | 0      | 0          | 0           |
| 80: | 134 | 226 | 286 | 3      | 2.075819   | 0.000924181 |
| 81: | 500 | 169 | 139 | 1000   | 1000       | 0           |
| 82: | 206 | 225 | 145 | 74     | 35.19651   | 0.03880349  |
| 83: | 355 | 225 | 104 | 539    | 574.892395 | 0.035892395 |
| 84: | 156 | 289 | 152 | 13     | 0          | 0.013       |
| 85: | 147 | 185 | 259 | 10     | 0          | 0.01        |
| 86: | 73  | 268 | 290 | 0      | 0          | 0           |
| 87: | 183 | 291 | 138 | 27     | 24.148697  | 0.002851303 |
| 88: | 135 | 227 | 139 | 3      | 0          | 0.003       |
| 89: | 375 | 220 | 144 | 868    | 731.909668 | 0.136090332 |
| 90: | 76  | 165 | 119 | 0      | 0          | 0           |
| 91: | 177 | 112 | 161 | 20     | 0          | 0.02        |
| 92: | 2   | 149 | 279 | 0      | 0          | 0           |
| 93: | 82  | 232 | 135 | 0      | 0          | 0           |
| 94: | 416 | 196 | 180 | 986    | 904.621887 | 0.081378113 |
| 95: | 283 | 240 | 126 | 314    | 259.201843 | 0.054798157 |
| 96: | 401 | 299 | 236 | 1000   | 951.222229 | 0.048777771 |
| 97: | 71  | 218 | 239 | 0      | 0          | 0           |
| 98: | 164 | 126 | 242 | 6      | 0          | 0.006       |
| 99: | 67  | 145 | 199 | 0      | 0          | 0           |

Average Error margin 0.035457811

TABLE 3

|     | R   | Y   | X   | Target | Prediction | Error       |
|-----|-----|-----|-----|--------|------------|-------------|
| 0:  | 125 | 111 | 294 | 0      | 0          | 0           |
| 1:  | 363 | 255 | 258 | 1000   | 914.375671 | 0.085624329 |
| 2:  | 73  | 132 | 280 | 0      | 0          | 0           |
| 3:  | 306 | 101 | 120 | 155    | 254.438751 | 0.099438751 |
| 4:  | 112 | 215 | 127 | 1      | 0          | 0.001       |
| 5:  | 145 | 246 | 199 | 12     | 19.163542  | 0.007163542 |
| 6:  | 39  | 206 | 292 | 1000   | 980.749939 | 0.019250061 |
| 7:  | 9   | 155 | 257 | 0      | 0          | 0           |
| 8:  | 198 | 232 | 228 | 81     | 114.89209  | 0.03389209  |
| 9:  | 372 | 269 | 199 | 997    | 903.566528 | 0.093433472 |
| 10: | 171 | 276 | 149 | 21     | 40.221466  | 0.019221466 |
| 11: | 110 | 279 | 151 | 0      | 0          | 0           |
| 12: | 426 | 232 | 149 | 995    | 975.465332 | 0.019534668 |
| 13: | 372 | 291 | 265 | 990    | 960.619202 | 0.029380798 |
| 14: | 474 | 111 | 207 | 997    | 1000       | 0.003       |
| 15: | 296 | 120 | 112 | 142    | 222.232361 | 0.080232361 |
| 16: | 139 | 268 | 185 | 7      | 14.815699  | 0.007815699 |
| 17. | 54  | 214 | 176 | 0      | 0          | 0           |
| 18: | 86  | 277 | 198 | 0      | 0          | 0           |
| 19: | 176 | 218 | 218 | 37     | 57.324017  | 0.02024017  |
| 20: | 441 | 189 | 221 | 1000   | 1000       | 0           |
| 21: | 175 | 177 | 202 | 34     | 30.486822  | 0.003513178 |
| 22: | 126 | 151 | 241 | 0      | 0          | 0           |
| 23: | 301 | 194 | 142 | 379    | 381.075897 | 0.002075897 |
| 24: | 340 | 166 | 245 | 828    | 727.458374 | 0.100541626 |
| 25: | 212 | 289 | 223 | 119    | 193.949173 | 0.074949173 |
| 26: | 55  | 259 | 171 | 0      | 0          | 0           |
| 27: | 346 | 226 | 299 | 976    | 878.258057 | 0.100741943 |
| 28: | 71  | 181 | 116 | 0      | 0          | 0           |
| 29: | 493 | 146 | 178 | 1000   | 1000       | 0           |
| 30: | 68  | 223 | 169 | 0      | 0          | 0           |
| 31: | 468 | 100 | 248 | 1000   | 1000       | 0           |
| 32: | 444 | 173 | 120 | 945    | 967.017639 | 0.022017639 |
| 33: | 103 | 121 | 279 | 0      | 0          | 0           |
| 34: | 162 | 148 | 173 | 16     | 0          | 0.016       |
| 35: | 106 | 185 | 201 | 0      | 0          | 0           |
| 36: | 273 | 195 | 103 | 161    | 197.809662 | 0.036809662 |
| 37: | 493 | 192 | 210 | 1000   | 1000       | 0           |
| 38: | 253 | 246 | 275 | 428    | 394.109497 | 0.033890503 |
| 39: | 493 | 230 | 228 | 1000   | 1000       | 0           |
| 40: | 224 | 178 | 172 | 119    | 100.000999 | 0.016999001 |
| 41: | 486 | 238 | 144 | 1000   | 1000       | 0           |
| 42: | 103 | 232 | 258 | 1      | 0          | 0.001       |
| 43: | 205 | 103 | 298 | 39     | 97.33886   | 0 05833886  |
| 44: | 172 | 119 | 276 | 13     | 35.616707  | 0.022616707 |
| 45: | 300 | 248 | 294 | 799    | 691.086548 | 0.107913452 |
| 48: | 463 | 247 | 208 | 1000   | 1000       | 0           |
| 47: | 288 | 201 | 208 | 580    | 422.690674 | 0.157309326 |
| 48: | 500 | 234 | 282 | 1000   | 1000       | 0           |
| 49: | 362 | 136 | 141 | 715    | 756.868042 | 0.041868042 |
| 50: | 21  | 203 | 285 | 0      | 0          | 0           |
| 51: | 270 | 263 | 197 | 497    | 389.70578  | 0.10729422  |
| 52: | 481 | 141 | 111 | 959    | 1000       | 0.041       |
| 53: | 272 | 172 | 257 | 424    | 371.239899 | 0.052760101 |
| 54: | 174 | 188 | 200 | 36     | 31.484074  | 0.004515926 |
| 55: | 156 | 237 | 1E0 | 12     | 12.954619  | 0.000954619 |
| 56: | 25  | 197 | 295 | 0      | 0          | 0           |
| 57: | 430 | 206 | 125 | 961    | 958.405884 | 0.002594116 |
| 58: | 87  | 146 | 144 | 0      | 0          | 0           |
| 89: | 441 | 236 | 175 | 1000   | 1000       | 0           |
| 60: | 365 | 229 | 282 | 1000   | 920.674377 | 0.079325623 |
| 61: | 64  | 192 | 273 | 0      | 0          | 0           |
| 62: | 272 | 116 | 165 | 147    | 185.918365 | 0.038918365 |
| 63: | 88  | 171 | 200 | 0      | 0          | 0           |

TABLE 3-continued

|     | R   | Y   | X   | Target | Prediction | Error       |
|-----|-----|-----|-----|--------|------------|-------------|
| 64: | 338 | 254 | 166 | 821    | 713.977234 | 0.107022766 |
| 65: | 372 | 286 | 203 | 1000   | 917.988098 | 0.082011902 |
| 66: | 256 | 251 | 293 | 412    | 444.524933 | 0.032524933 |
| 67: | 310 | 295 | 288 | 792    | 786.282227 | 0.005717773 |
| 68: | 65  | 143 | 262 | 0      | 0          | 0           |
| 69: | 409 | 147 | 193 | 942    | 919.930542 | 0.022069458 |
| 70: | 445 | 249 | 161 | 1000   | 1000       | 0           |
| 71: | 156 | 294 | 150 | 10     | 28.180014  | 0.018180014 |
| 72: | 71  | 243 | 251 | 0      | 0          | 0           |
| 73: | 452 | 200 | 179 | 1000   | 1000       | 0           |
| 74: | 84  | 267 | 204 | 0      | 0          | 0           |
| 75: | 85  | 276 | 222 | 0      | 0          | 0           |
| 76: | 12  | 193 | 147 | 0      | 0          | 0           |
| 77: | 133 | 172 | 144 | 3      | 0          | 0.003       |
| 78. | 17  | 147 | 146 | 0      | 0          | 0           |
| 79: | 24  | 202 | 277 | 0      | 0          | 0           |
| 80: | 134 | 226 | 286 | 3      | 34.2714    | 0.0312714   |
| 81: | 500 | 169 | 139 | 1000   | 1000       | 0           |
| 82: | 206 | 225 | 145 | 74     | 71.334969  | 0.002665031 |
| 83: | 355 | 225 | 104 | 539    | 675.581909 | 0.136581909 |
| 84: | 156 | 289 | 152 | 13     | 27.261385  | 0.014261385 |
| 85: | 147 | 185 | 259 | 10     | 23.620691  | 0.013620691 |
| 86: | 73  | 268 | 290 | 0      | 0          | 0           |
| 87: | 183 | 291 | 138 | 27     | 59.19437   | 0.03219437  |
| 88: | 135 | 227 | 139 | 3      | 0          | 0.003       |
| 89: | 375 | 220 | 144 | 868    | 820.159302 | 0.047840698 |
| 90: | 76  | 165 | 119 | 0      | 0          | 0           |
| 91: | 177 | 112 | 161 | 20     | 0          | 0.02        |
| 92: | 2   | 149 | 279 | 0      | 0          | 0           |
| 93: | 82  | 232 | 135 | 0      | 0          | 0           |
| 94: | 416 | 196 | 180 | 986    | 956.204285 | 0.029795715 |
| 95: | 283 | 240 | 126 | 314    | 321.955505 | 0.007955505 |
| 96: | 401 | 299 | 236 | 1000   | 999.105042 | 0.000894958 |
| 97: | 71  | 218 | 239 | 0      | 0          | 0           |
| 98: | 164 | 126 | 242 | 6      | 14.67848   | 0.00867848  |
| 99: | 67  | 145 | 199 | 0      | 0          | 0           |

Average Error Margin 0.022645462

Other embodiments are within the scope of the following claims.

What is claimed is:

1. A computer-operated apparatus for generating selectivity values in a database management system (DBMS), the DBMS having one or more tables for storing data, each table having zero or more user-defined routines (UDRs), said apparatus comprising:

a feature vector extractor coupled to said one or more database tables, said feature vector extractor being adapted to convert said UDR into a base representation;

a neural network coupled to the feature vector extractor for generating selectivity values based on the base representation; and an optimizer coupled to said neural network, said optimizer dynamically applying said neural network to determine an optimum query search sequence for the DBMS based on the generated selectivity values.

2. The apparatus of claim 1, wherein the neural network has a feedback input and wherein the neural network is trained using a training data set having a desired output portion, and further comprising an error estimator having inputs coupled to the desired output portion and the neural network and an output coupled to the feedback input.

3. The apparatus of claim 2, further comprising a random query generator coupled to the database to generate the training data set.

4. The apparatus of claim 3, wherein each table has zero or more columns of user-definable data types (UDTs), and further comprising a constructor coupled to the zero or more columns and zero or more UDRs in the table and to the query generator, wherein the constructor reduces the UDTs into one or more base types and forms a query based on the base types.

5. The apparatus of claim 2, further comprising:

a neural network generator for generating a plurality of uniquely configured neural networks; and a neural network selector coupled to said neural network generator and to said error estimator, said neural network selector selecting one of said uniquely configured neural networks with the lowest error as the neural network to be applied by the optimizer.

6. The apparatus of claim 1, wherein said neural network is defined by a matrix of weights, and further comprising a code generator coupled to said neural network, said code generator converting said matrix into machine instructions for execution by a processor.

7. The apparatus of claim 6, further comprising a system table in the database, wherein information relating to the execution of said machine instructions are stored in said system table suitable for dynamic invocation during a database query.

8. The apparatus of claim 1, wherein said neural network is a back propagation neural network.

9. The apparatus of claim 1, wherein said neural network is a cascade correlation neural network.

10. A computer system, comprising:

a processor;

a memory array coupled to said processor;

a display coupled to said processor;

a data storage device coupled to said processor for storing a database management system (DBMS) with one or more tables for storing data, each table having zero or more user-defined routines (UDRs);

a feature vector extractor coupled to said one or more database tables, said feature vector extractor being adapted to convert said UDR into a base representation;

a neural network coupled to the feature vector extractor for generating selectivity values based on the base representation; and an optimizer coupled to said neural network, said optimizer dynamically applying said neural network to determine an optimum query search sequence for the DBMS based on the generated selectivity values.

11. The computer system of claim 10, wherein the neural network has a feedback input and wherein the neural network is trained using a training data set having a desired output portion, and further comprising an error estimator having inputs coupled to the desired output portion and the neural network, and an output coupled to the feedback input.

12. The computer system of claim 11, further comprising a random query generator coupled to the database to generate the training data set.

13. The computer system of claim 12, wherein each table has zero or more columns of user-definable data types (UDTs), and further comprising a constructor coupled to the zero or more columns and the zero or more UDRs in the table and to the query generator, wherein the constructor reduces the UDTs into one or more base types and forms a query based on base types.

14. A computer implemented method for generating selectivity values for a database management system (DBMS) optimizer, the DBMS having one or more tables for storing data, each table having zero or more columns of user-definable data types, comprising:

selecting data from the database;

extracting feature vectors from the data;

applying said feature vectors to a neural network to dynamically generate selectivity values; and applying said selectivity values to said optimizer to determine an optimum query search sequence for the DBMS.

15. The method of claim 14, wherein the selection of data further comprises specifying a database, a table, a column, and one or more functions and parameters associated with a user-definable data type.

16. The method of claim 14, further comprising training said neural network.

17. The method of claim 16, wherein the training further comprises:

determining one or more constructors for each function;

generating queries for each function using random input parameters;

executing said queries to generate training data;

partitioning said training data into a training set and a validation set;

adjusting said neural network with said training set; and checking the accuracy of said neural network by applying the validation set to said neural network.

18. The method of claim 17, wherein if the accuracy of said neural network is unacceptable, repeatedly performing the following operations until the accuracy becomes acceptable:

modifying parameters of said neural network;

adjusting said neural network with said training set; and checking the accuracy of said neural network by applying the validation set to said neural network.

19. The method of claim 14, wherein said neural network is defined by a matrix of weights, further comprising the step of converting said matrix into machine instructions suitable for execution by a processor.

20. The method of claim 19, further comprising the step of registering said machine instructions in a system table.

21. Computer software for a database management system (DBMS), the computer software residing on a computer-readable medium and comprising instructions for causing a computer to perform the following operations:

select data from a database;

extract feature vectors from the selected data;

generate selectivity values by applying the extracted feature vectors to a neural network; and determine an optimum query search sequence for the DBMS by applying the generated selectivity values to an optimizer.

22. The software of claim 21, further comprising instructions for training the neural network periodically upon a user request.

23. The software of claim 21, further comprising instructions for training the neural network dynamically as the DBMS operates.

24. The software of claim 21, further comprising instructions for applying one neural network to determine selectivity information.

25. The software of claim 21, further comprising instructions for applying one neural network to determine cost per call information.

* * * * *